(12) United States Patent
Rohee et al.

(10) Patent No.: US 8,079,759 B2
(45) Date of Patent: Dec. 20, 2011

(54) FLARED SLIDER FOR VEHICLE SEAT

(75) Inventors: René Rohee, La Chapelle Biche (FR); Jean-Marie Fretel, Ger (FR)

(73) Assignee: Faurecia Sièges d'Automobile, Nanterre (FR)

( * ) Notice: Subject to any disclaimer, the term of this patent is extended or adjusted under 35 U.S.C. 154(b) by 726 days.

(21) Appl. No.: 12/281,498

(22) PCT Filed: Mar. 14, 2007

(86) PCT No.: PCT/FR2007/000442
§ 371 (c)(1),
(2), (4) Date: Oct. 24, 2008

(87) PCT Pub. No.: WO2007/118946
PCT Pub. Date: Oct. 25, 2007

(65) Prior Publication Data
US 2009/0060401 A1    Mar. 5, 2009

(30) Foreign Application Priority Data
Mar. 17, 2006   (FR) ..................................... 06 02399

(51) Int. Cl.
  B60N 2/07    (2006.01)
  F16M 13/00   (2006.01)
(52) U.S. Cl. .............................. 384/34; 384/55; 248/430
(58) Field of Classification Search .................... 384/10, 384/17, 18, 19, 34, 37, 49, 50, 55; 248/424, 248/429, 430; 296/65.13–65.15; 297/311, 297/341, 344.11
See application file for complete search history.

(56) References Cited

U.S. PATENT DOCUMENTS

| 2,285,616 | A  |   | 6/1942  | Saunders et al.         |
|-----------|----|---|---------|-------------------------|
| 4,569,563 | A  | * | 2/1986  | Fourrey ........... 384/49 |
| 5,984,254 | A  | * | 11/1999 | Baloche et al. ...... 248/430 |
| 6,427,962 | B1 | * | 8/2002  | Rohee et al. ........ 248/424 |

FOREIGN PATENT DOCUMENTS

| DE | 34 38 229 |   | 4/1986  |
|----|-----------|---|---------|
| DE | 3438229   | * | 4/1986  |
| EP | 0 181 499 |   | 5/1986  |
| EP | 0181499   | * | 5/1986  |
| EP | 0 568 900 |   | 11/1993 |
| EP | 0568900   | * | 11/1993 |
| FR | 2312391   | * | 5/1976  |
| FR | 2 793 453 |   | 11/2000 |
| FR | 2793453   | * | 11/2000 |

OTHER PUBLICATIONS

International Search Report from counterpart application No. PCT/FR2007/000442; Report dated Nov. 12, 2007.

* cited by examiner

*Primary Examiner* — James Pilkington
(74) *Attorney, Agent, or Firm* — Miller, Matthias & Hull LLP

(57) ABSTRACT

A slider for a motor vehicle seat including a stationary profile section extending in a longitudinal direction and comprising a substantially planar base plate and at least one side shoulder, said base plate having a substantially constant width and including an attachment area for receiving a head of a fastening screw, wherein the stationary profile section has a local deformation increasing the width of the base plate and narrowing the shoulder to the extent that the raceway of the stationary profile section is blocked; a movable profile section; roller elements rolling along a raceway extending longitudinally on the shoulder of the stationary profile section and retained in position relative to each other by cage.

10 Claims, 4 Drawing Sheets

FLARED SLIDER FOR VEHICLE SEAT

CROSS-REFERENCE TO RELATED APPLICATIONS

This application is a U.S. national stage filing of International Patent Application No. PCT/FR2007/000442 filed on Mar. 14, 2007, which claims priority under the Paris Convention to French Patent Application No. 06 02399, filed on Mar. 17, 2006.

FIELD OF THE DISCLOSURE

This invention relates to a slider for an automotive vehicle seat.

BACKGROUND OF THE DISCLOSURE

Document U.S. Pat. No. 2,285,616 discloses a slider comprising:
- a fixed profile section extending in a longitudinal direction and intended to be attached to the structure of the vehicle, said fixed profile section comprising a base plate and at least one side shoulder, and having an attachment area intended to receive the head of a fastening screw, said fixed profile section having a local deformation in the attachment area,
- a movable profile section extending in a longitudinal direction and intended to hold an automotive vehicle seat, and
- roller elements arranged between the fixed profile section and the movable profile section, the roller elements enabling the movable profile section to slide relative to the fixed profile section by rolling along a raceway extending in a longitudinal direction on the shoulder of the fixed profile section.

As the cross-section of the profile section is not completely constant along its entire length, the rigidity of the profile section is improved, particularly in the attachment area.

The invention aims to reduce the cost of such a slider and to improve its robustness.

SUMMARY OF THE DISCLOSURE

To this end, according to the invention, the slider has the following characteristics:
- the base plate is substantially planar and has a substantially constant width in a transverse direction perpendicular to the longitudinal direction,
- the local deformation increases the width of the base plate and narrows the shoulder in a transverse direction until it forms a break in the raceway of the fixed profile section, and
- the roller elements are held relative to each other by a cage.

The break in the raceway allows for the width of the fixed profile section and therefore of the slider to be reduced in the transverse direction, without reducing the width (diameter) of the head of the fastening screw. The slider is thus more compact, is better able to withstand the stresses applied to it, requires less material leading to reduced cost, and is lighter. By holding the roller elements in a cage, their correct positioning along the raceway is ensured, despite the presence of the break in the raceway. In particular, this prevents the roller elements remaining wedged in the break in the raceway.

In order to further increase the strength of the slider, according to an additional characteristic according to the invention, the slider comprises at least one group of three roller elements separated from each other by the cage by a distance greater than the length of the break in the raceway.

This ensures that the movable profile section rests on the fixed profile section using at least two roller elements that are relatively close to each other.

According to another characteristic according to the invention, intended to improve the compactness of the slider, the slider further comprises a fastening screw and a hole made in the base plate in the attachment area, said fastening screw being intended to hold the fixed profile section to the floor of the vehicle by passing through the hole and having a head intended to rest against the base plate, said head having a width in the transverse direction greater than the width of the base plate away from the attachment area.

According to another characteristic according to the invention, the slider comprises:
- two fastening screws,
- close to each end of the slider in a longitudinal direction, two attachment areas in each of which the fixed profile section has:
  - a local deformation increasing the width of the base plate in a transverse direction and forming a break in the raceway, and
  - a hole made in the base plate in each attachment area,
- two groups of three roller elements, the cage holding the roller elements in each group apart from each other by a distance greater than the length of each of the breaks in the raceway.

Thus, the slider is particularly strong, compact and securely fastened to the floor.

According to the invention, the slider further advantageously has the following characteristics:
- the base plate defines a base plane extending in the longitudinal direction and the transverse direction, and
- the shoulder comprises:
  - a substantially planar supporting portion extending substantially parallel to the base plane and offset relative to the base plane towards the movable profile section, and
  - a joining portion extending between the supporting portion and the base plate.

According to another characteristic according to the invention, the base plate has in the attachment area a planar attachment portion offset relative to the base plane opposite the movable profile section.

The compactness of the slider and its attachment to the floor are thus improved.

In order to further improve the compactness of the slider, according to an additional characteristic according to the invention, the supporting portion is advantageously offset relative to the attachment portion of the base plate by a distance slightly greater than the height of the head of the fastening screw in a direction perpendicular to the base plane.

According to another characteristic according to the invention, the slider advantageously comprises two side shoulders arranged on either side of the base plate.

According to the invention, the slider further advantageously has the following characteristics:
- the fixed profile section further comprises:
  - two wings extending upwards away from the base plate from the side shoulders, and
  - two re-entrant troughs that extend the two wings inwards and in the direction of the base plate, the two re-entrant troughs defining between them a slot, substantially level with the attachment area, the two re-entrant troughs have notches arranged facing each other to provide a passage for the head of the fastening screw, and away from the notches, the re-entrant troughs are spaced apart in a transverse direction by a distance less than the width of the head of the fastening screw in the transverse direction.

Thus, the insertion of the fastening screws between the troughs of the fixed profile section is facilitated and the compactness of the slider is further improved.

According to another characteristic according to the invention, the local deformation in the attachment area is moreover advantageously obtained by stamping.

BRIEF DESCRIPTION OF THE DRAWINGS

Other characteristics and advantages of the invention will become apparent during the following description of an embodiment given as a non-limitative example, with reference to the appended drawings, in which.

DETAILED DESCRIPTION OF THE DISCLOSURE

Figure 1:
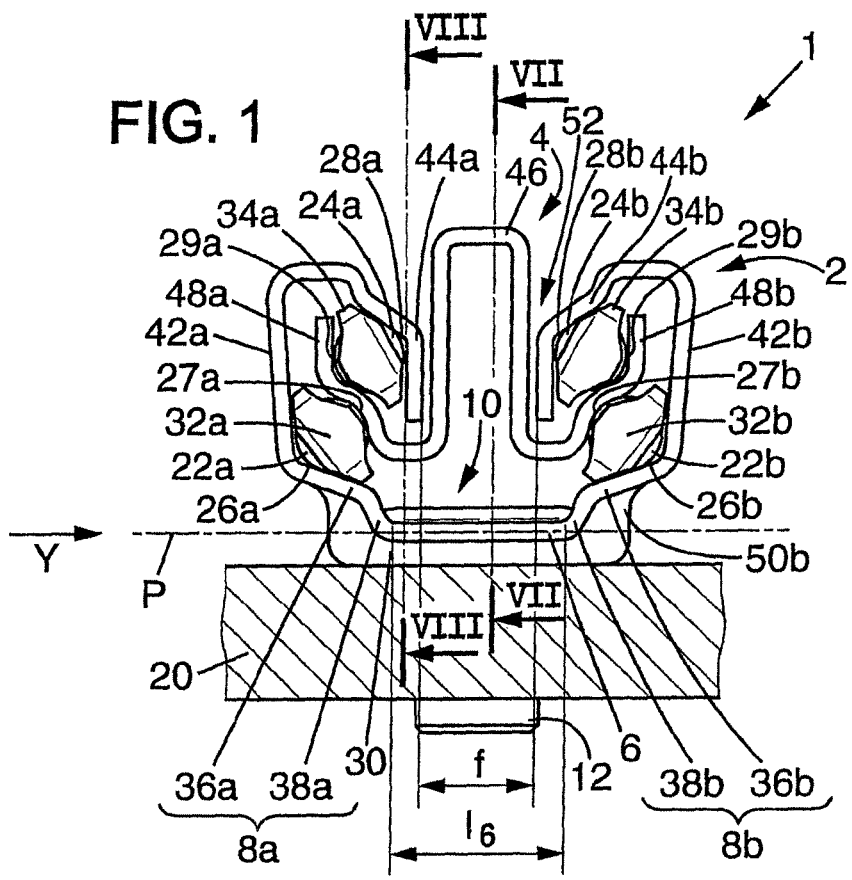
FIG. 1 is a front view of a slider according to the invention essentially comprising a fixed profile section, a movable profile section, a fastening screw and roller elements.
Figure 2:
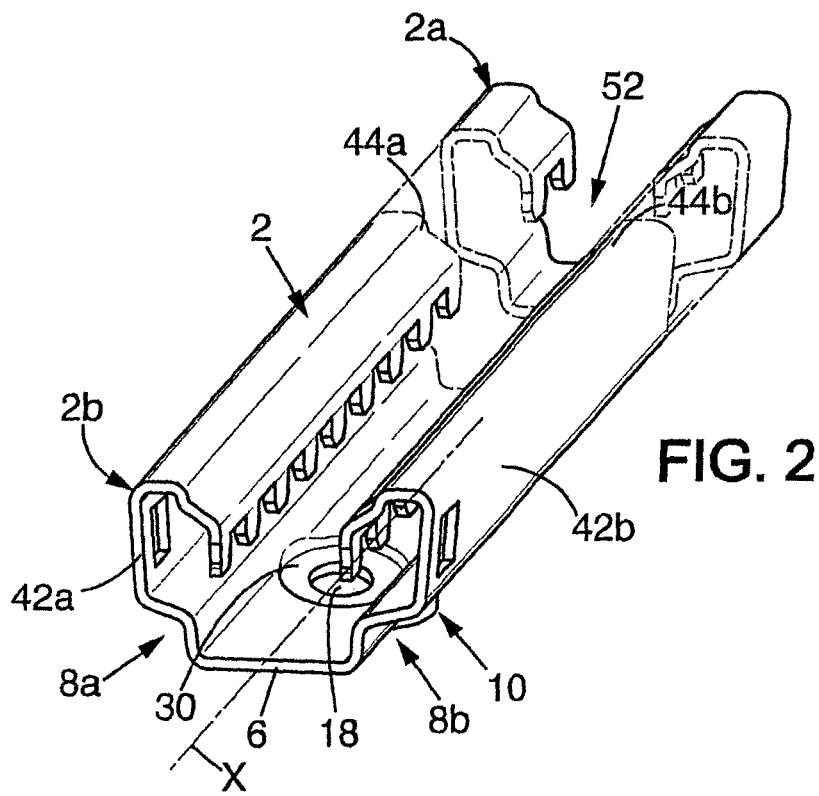
FIG. 2 is a perspective view of the fixed profile section only.
Figure 3:
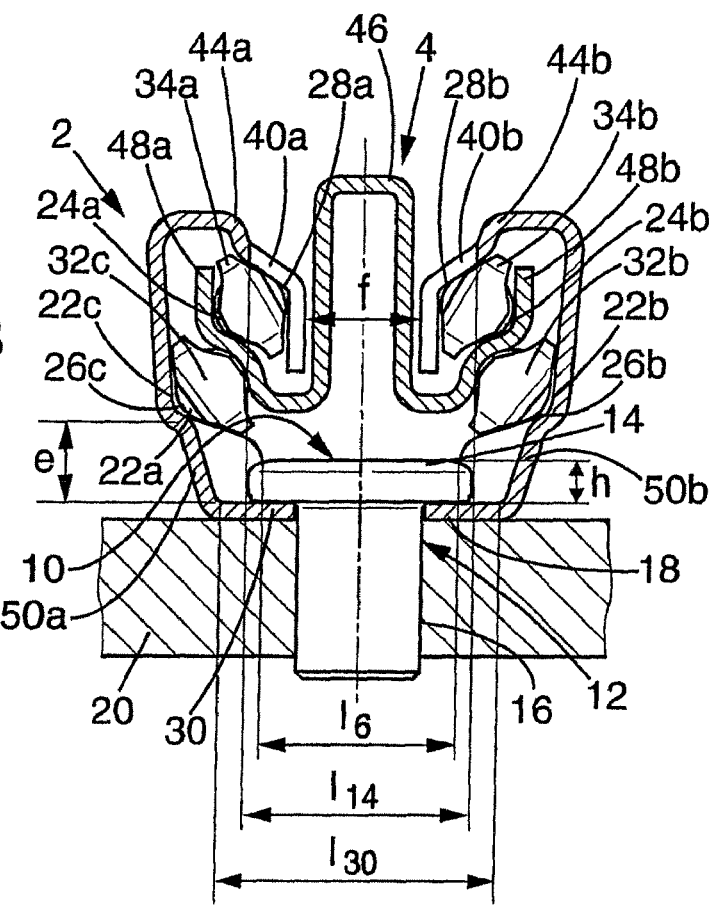
FIG. 3 is a cross-sectional view of the slider.
Figure 4:
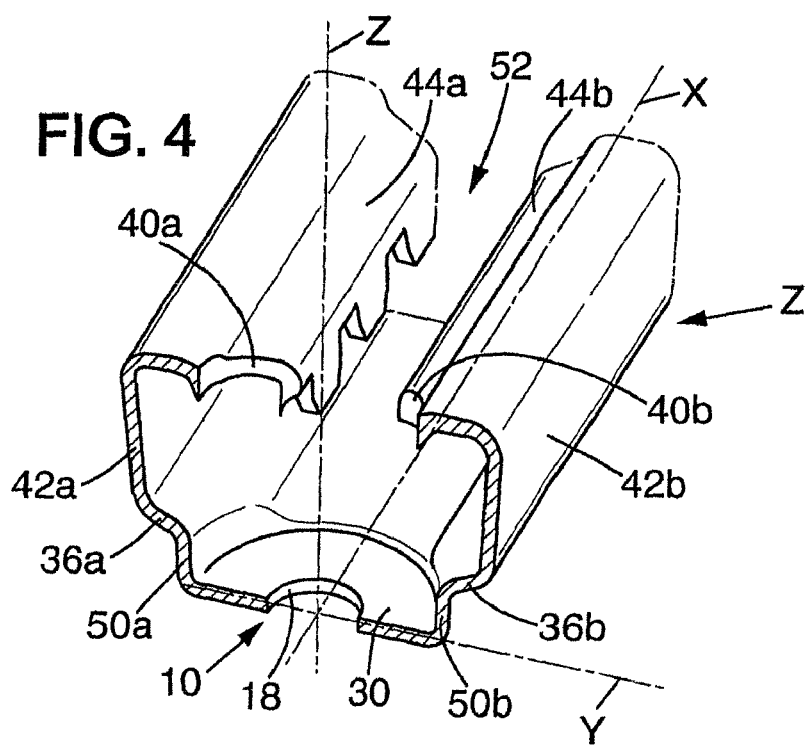
FIG. 4 is a perspective view of the fixed profile section only, in the cross-section according to FIG. 3.
Figure 5:
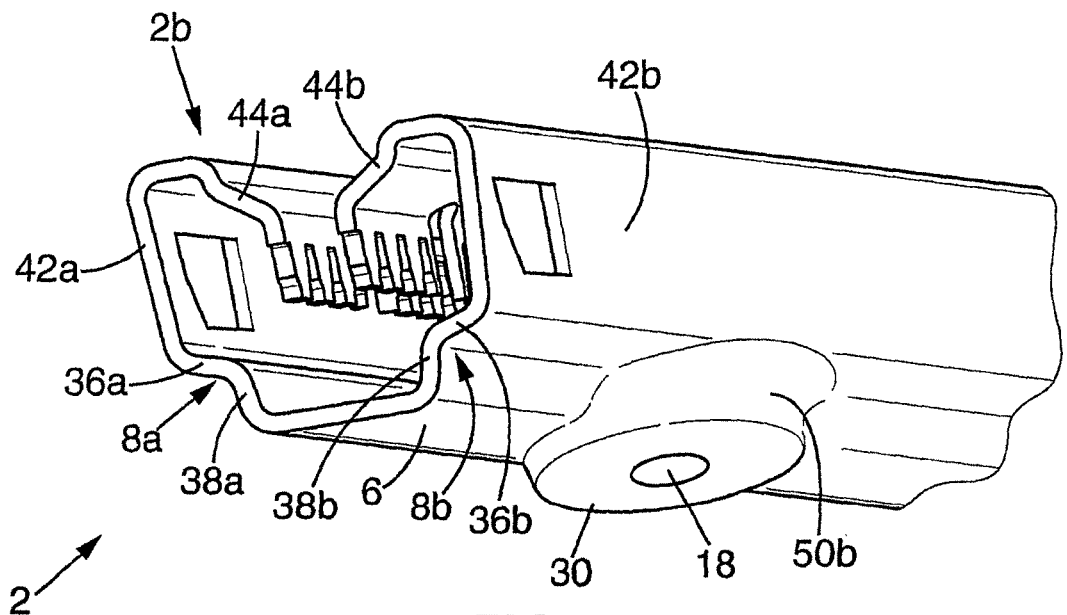
FIG. 5 is a bottom perspective view of the fixed profile section only.
Figure 6:
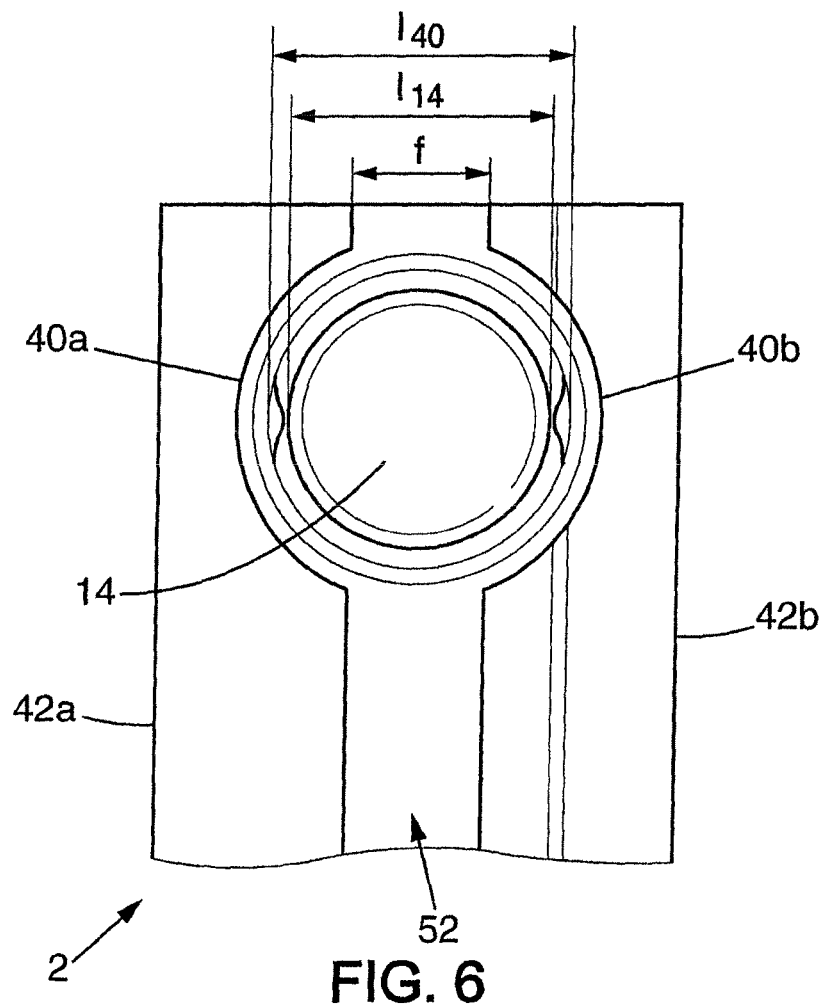
FIG. 6 is a top view of the slider.

In the various figures, the same reference number denotes identical or similar components.

The figures show a slider 1 for an automotive vehicle seat essentially comprising a fixed profile section 2, a movable profile section 4, balls 22a, 22b, 24a, 24b, 25a forming roller elements and fastening screws 12.

The fixed profile section 2 extends in a longitudinal direction X between a front end 2a and a rear end 2b. It essentially comprises a substantially horizontal base plate 6, two side shoulders 8a, 8b extending on either side of the base plate 6, two substantially vertical wings 42a, 42b extending upwards from the side shoulders 8a, 8b, and two re-entrant troughs 44a, 44b that extend the two wings 42a, 42b inwards and downwards towards the base plate 6.

The base plate 6 is substantially planar and defines a base plane P. It extends in a longitudinal direction X and has, in a transverse direction Y parallel to the base plan P and perpendicular to the longitudinal direction X, a substantially constant width $l_6$.

Each shoulder 8a, 8b comprises a substantially planar supporting portion 36a, 36b extending substantially parallel to the base plane P and a joining portion 38a, 38b extending between each of the supporting portions 36a, 36b and the base plate 6. In an elevation direction Z perpendicular to the base plane P, the supporting portions 36a, 36b are offset upwards (towards the movable profile section 4) relative to the base plane P. The joining portions 38a, 38b are generally planar and extend substantially in the elevation direction Z and the longitudinal direction X.

Close to each of its ends 2a, 2b in the longitudinal direction X, the fixed profile section 2 has, in a corresponding attachment area 10, a local deformation forming a bulge, and a hole 18. These local deformations are obtained by stamping the fixed profile section 2. Each of these local deformations is characterised by an attachment portion 30 on the base plate 6 having a width $l_{30}$ greater than the width $l_6$ of the base plate 6 away from its attachment areas 10, a concomitant narrowing of the side shoulders 8a, 8b in the transverse direction Y, and by a cylindrical part 50a, 50b, having a circular cross-section, of the joining portions 38a, 38b. Furthermore, in the attachment area 10, the attachment portion 30 is advantageously offset by approximately 1 millimeter downwards relative to the base plane P in the elevation direction Z, in other words towards the floor 20 and away from the movable profile section 4.

The fastening screws 12 each comprise a head 14 and a threaded shank 16, both substantially cylindrical, extending in the elevation direction Z. The threaded shank 16 of each of the fastening screws 12 passes through one of the attachment holes 18 and is screwed into the floor 20 of the vehicle, in such a way that the head 14 of each of the fastening screws 12 rests against the corresponding attachment portion 30 to hold the fixed profile section 2 onto the floor 20 close to each of its ends 2a, 2b. Each of the supporting portions 36a, 36b is offset upwards relative to the attachment portion 30 by a distance e that is slightly greater than the height h of the head 14 of each of the fastening screws 12 in the elevation direction Z.

Furthermore, the head 14 of the fastening screws 12 has a width $l_{14}$ in the transverse direction Y corresponding here to their diameter. This width $l_{14}$ is comprised between the width $l_6$ of the base plate 6 away from the attachment area 10 and the width $l_{30}$ of the attachment portion 30 in the transverse direction Y.

The movable profile section 4 extends in the longitudinal direction X and is intended to support an automotive vehicle seat. It comprises a central casing 46 from the bottom of which two side wings 48 extend outwards between the supporting portions 36a, 36b and the re-entrant troughs 44a, 44b.

The balls 22a, 22b, 24a, 24b, 25a are used to guide the movable profile section 4 as it slides relative to the fixed profile section 2 by rolling along the raceways 26a, 26b, 27a, 27b, 28a, 28b, 29a, 29b extending in the longitudinal direction X and arranged on the fixed profile section 2 and the movable profile section 4. The lower left-hand balls 22a are held relative to each other by a cage 32a. They roll on the one hand on the supporting portion 36a of the fixed profile section 2 along the lower raceway 26a, and on the other hand on the side wing 48a along the raceway 27a. In a symmetrical manner, the lower right-hand balls 22b are held relative to each other by a cage 32b and roll on the one hand on the supporting portion 36b along the raceway 26b and on the other hand on the side wing 48b along the raceway 27b. Furthermore, the upper left-hand balls 24 are held relative to each other by a cage 34a and roll on the one hand on the side wing 48a along a raceway 29a and on the other hand on the trough 44a along a raceway 28a. Finally, the upper right-hand balls 24b are held relative to each other by a cage 34b and roll on the one hand on the side wing 48b along a raceway 29b and on the other hand on the trough 44b along the raceway 24b.

Due to the narrowing of the supporting portions 36a, 36b in the attachment areas 10, a break is formed in the raceways 26a, 26b over a length $l_{26}$ in each of the attachment areas 10. At least one group of three balls 22a, 22b rolls in the raceways 26a, 26b close to each of the ends 2a, 2b of the fixed profile section 2, in other words close to each attachment area 10. The balls 22a, 22b are separated from each other by the cages 32a, 32b by a distance d greater than the length $l_{26}$ of the breaks in the raceways 26a, 26b.

Furthermore, at the level of each of the attachment areas 10, the re-entrant troughs 44a, 44b have notches 40a, 40b arranged facing each other to provide a passage for the head 14 of each of the fastening screws 12. These notches 40a, 40b are formed by cut-outs in order to form, level with the attachment area 10, a cylindrical gap with a substantially circular cross-section substantially identical to the cross-section of the attachment portion 30. Consequently, level with the attachment area 10, the re-entrant troughs 44a, 44b are separated from each other in the transverse direction Y by a distance $l_{40}$ slightly greater than the width $l_{14}$ of the head 14 of the fastening screw 12. However, away from this attachment area 10 in the longitudinal direction X, the re-entrant troughs 44a, 44b are separated from each other by a slot 52 with a width f less than the width $l_{14}$ of the head 14 of each of the fastening screws 12.

Figure 8:
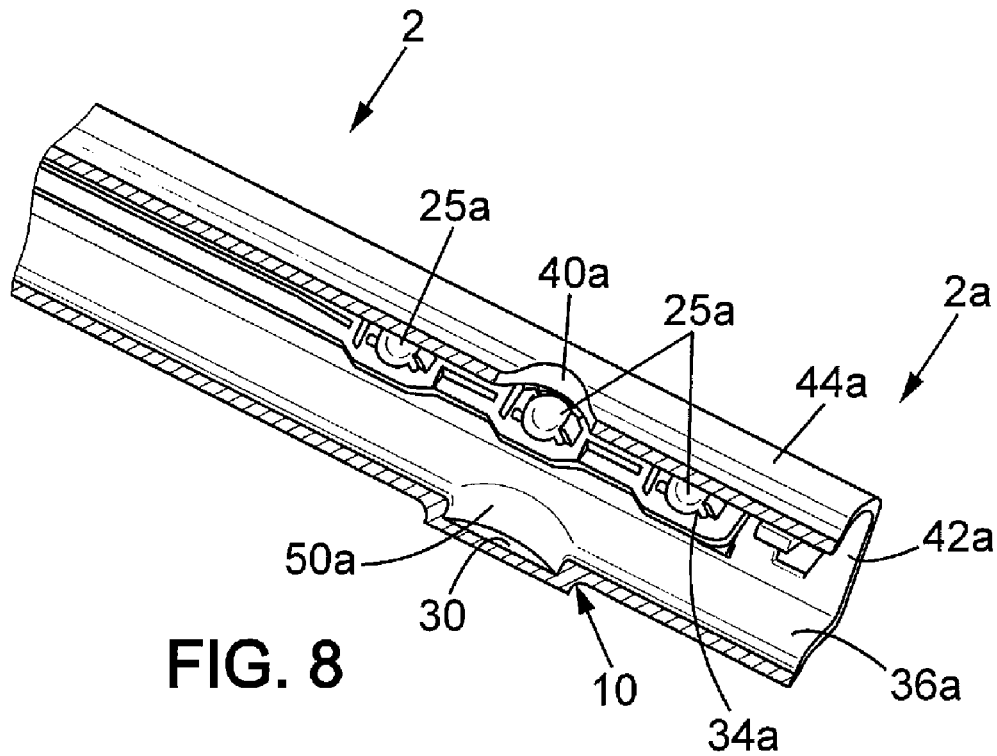
FIG. 8 is a partial cross-sectional perspective view of the slider in a section along the line marked VIII-VIII in FIG. 1.
Figure 7:
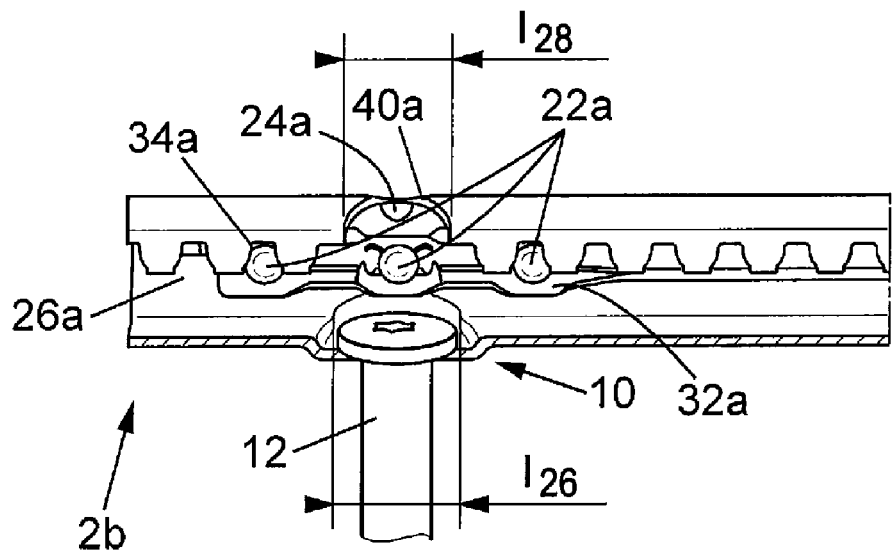
FIG. 7 is a partial cross-sectional view along the line marked VII-VII in FIG. 1.

The deformation area 10 shown in FIGS. 1 to 7 is located close to the rear end 2b. FIG. 8 shows the fact that the fixed profile section 2 further comprises an attachment area 10 close to its front end 2a. The attachment areas 10 close to the ends 2a and 2b are substantially identical. In particular, as shown in FIG. 8, the attachment area 10 close to the end 2b further comprises a local deformation 30, 50a and notches 40a made in the re-entrant troughs 44a, 44b. Although only one group of three upper left-hand balls 25a is shown in this figure, held together by the ball cage 32a close to the front end 2a, it will be understood that the slider further comprises a group of lower left-hand balls held together by the ball cage 32a and rolling in the raceways 26a and 27a close to the end 2a, as well as a group of at least three lower right-hand balls held together by the ball cage 32b and rolling in the raceways 26b and 27b, and upper right-hand balls held together by the ball cage 34b and rolling in the raceways 28b and 29b.

Of course, the invention is in no way limited to the embodiment described above as a non-limitative illustration. Thus, although in the example illustrated all of the cages separate the balls by the same distance, and all of the notches and all of the attachment portions are the same dimension, this could be different without departing from the scope of the invention.

The invention claimed is:

1. A slider for an automotive vehicle seat comprising:
a fixed profile section extending in a longitudinal direction and intended to be attached to a structure of a vehicle, said fixed profile section comprising a base plate and at least one side shoulder and having an attachment area intended to receive a head of a fastening screw, said fixed profile section having a local deformation in the attachment area,
a movable profile section extending in the longitudinal direction and intended to hold the automotive vehicle seat, and
roller elements arranged between the fixed profile section and the movable profile section, the roller elements enabling the movable profile section to slide relative to the fixed profile section by rolling along a raceway extending in the longitudinal direction on the at least one shoulder of the fixed profile section,
wherein the base plate is substantially planar and has, in a transverse direction perpendicular to the longitudinal direction, a substantially constant width,
the local deformation increases the width of the base plate and narrows the at least one shoulder in the transverse direction until it forms a break in the raceway of the fixed profile section, and
the roller elements are held relative to each other by a cage.

2. The slider according to claim 1, comprising at least one group of three roller elements separated from each other by the cage by a distance greater than the length of the break in the raceway.

3. The slider according to claim 1, further comprising the fastening screw and a hole made in the base plate in the attachment area, said fastening screw being intended to hold the fixed profile section to a floor of the vehicle by passing through the hole and having a head intended to rest against the base plate, said head having a width in the transverse direction greater than the width of the base plate away from the attachment area.

4. The slider according to claim 3, comprising:
two fastening screws,
two attachment areas in the fixed profile section, each attachment area having:
a local deformation that increases the width of the base plate in the transverse direction and forms a break in the raceway, and
a hole made in the base plate in each attachment area;
two groups of three roller elements, a cage holding the roller elements in each of the groups apart from each other by a distance greater than the length of each of the breaks in the raceway.

5. The slider according to claim 1, in which:
the base plate defines a base plane extending in the longitudinal direction and in the transverse direction, and
the at least one shoulder comprises:
a substantially planar supporting portion extending substantially parallel to the base plane and offset relative to the base plane towards the movable profile section, and
a joining portion extending between the supporting portion and the base plate.

6. The slider according claim 5, in which the base plate has in the attachment area a planar attachment portion offset relative to the base plane opposite the movable profile section.

7. The slider according to claim 6 wherein:
the supporting portion is offset relative to the attachment portion of the base plate by a distance slightly greater than a height of the head of the fastening screw in an elevation direction perpendicular to the base plane.

8. The slider according to claim 1, comprising two side shoulders arranged on either side of the base plate.

9. The slider according to claim 8, in which:
the fixed profile section also comprises:
two wings that extend upwards away from the base plate from the side shoulders, and
two re-entrant troughs that extend the two wings inwards and towards the base plate, the two re-entrant troughs defining a slot between them,
substantially level with the attachment area, the two re-entrant troughs have notches arranged facing each other to provide a passage for the head of the fastening screw, and
away from the notches, the re-entrant troughs are separated in the transverse direction by a distance less than the width of the head of the fastening screw in the transverse direction.

10. The slider according to claim 1, in which the local deformation in the attachment area is obtained by stamping.

* * * * *